(12) United States Patent
Bourgeois

(10) Patent No.: US 10,415,959 B2
(45) Date of Patent: Sep. 17, 2019

(54) METHOD FOR CALIBRATING AN AUGMENTED REALITY VISUAL RENDERING SYSTEM COMPRISING AT LEAST ONE DISPLAY DEVICE THAT IS PARTIALLY TRANSPARENT WITH RESPECT TO THE USER THEREOF, AND ASSOCIATED SYSTEM

(71) Applicant: COMMISSARIAT A L'ENERGIE ATOMIQUE ET AUX ENERGIES ALTERNATIVES, Paris (FR)

(72) Inventor: Steve Bourgeois, Choisy le Roy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 80 days.

(21) Appl. No.: 15/524,988

(22) PCT Filed: Dec. 1, 2015

(86) PCT No.: PCT/EP2015/078139
§ 371 (c)(1),
(2) Date: May 5, 2017

(87) PCT Pub. No.: WO2016/087407
PCT Pub. Date: Jun. 9, 2016

(65) Prior Publication Data
US 2017/0322020 A1  Nov. 9, 2017

(30) Foreign Application Priority Data

Dec. 3, 2014 (FR) ...................................... 14 61866

(51) Int. Cl.
*G01B 11/25* (2006.01)
*G02B 27/01* (2006.01)
(Continued)

(52) U.S. Cl.
CPC ............. *G01B 11/2504* (2013.01); *B60J 9/00* (2013.01); *G01B 11/25* (2013.01); *G02B 27/01* (2013.01);
(Continued)

(58) Field of Classification Search
CPC .......................... G02B 27/0172; G01B 11/25
See application file for complete search history.

(56) References Cited

U.S. PATENT DOCUMENTS

2002/0105484 A1  8/2002  Navab et al.
2013/0044042 A1  2/2013  Olsson et al.
(Continued)

OTHER PUBLICATIONS

Tuceryan et al., Single Point Active Alignment Method (SPAAM) for Optical See-through HMD Calibration for Augmented Reality, Jun. 2002, Presence Teleoperators & Virtual Environments, pp. 1-32.*

(Continued)

*Primary Examiner* — Matthew Salvucci
(74) *Attorney, Agent, or Firm* — Baker & Hostetler LLP

(57) ABSTRACT

A method for calibrating an augmented reality visual rendering system comprising at least one display device partially transparent with respect to the user thereof, comprises carrying out the steps of: displaying a two-dimensional calibration curve on a partially transparent display device of the partially transparent display device; recording a three-dimensional curve described by the user by a three-dimensional pointing device so that the trajectory described by the three-dimensional pointing device is aligned, according to the viewpoint of the user, with the two-dimensional calibration curve displayed on the display device; and matching the three-dimensional curve and the two-dimensional calibration curve displayed on the display device; and comprising a step of calibrating the augmented reality visual rendering system by determining the parameters of a model to repre- (Continued)

sent the set comprising the eye of the user 1 and the partially transparent display device of the partially transparent display device at which the eye is looking, on the basis of matching.

11 Claims, 2 Drawing Sheets

(51) Int. Cl.
    *H04N 5/369*     (2011.01)
    *B60J 9/00*     (2006.01)
    *H04N 13/344*     (2018.01)
    *H04N 13/327*     (2018.01)

(52) U.S. Cl.
    CPC ....... *G02B 27/0101* (2013.01); *G02B 27/017* (2013.01); *G02B 27/0172* (2013.01); *G02B 27/0179* (2013.01); *G02B 27/0189* (2013.01); *H04N 5/3696* (2013.01); *H04N 13/327* (2018.05); *H04N 13/344* (2018.05); *G02B 2027/014* (2013.01); *G02B 2027/0178* (2013.01); *G02B 2027/0181* (2013.01)

(56) References Cited

U.S. PATENT DOCUMENTS

| | | | |
|---|---|---|---|
| 2014/0139453 A1 | 5/2014 | Yu et al. | |
| 2014/0282259 A1 | 9/2014 | Fujimura et al. | |
| 2014/0361976 A1* | 12/2014 | Osman | G02B 27/0172 345/156 |

OTHER PUBLICATIONS

Jung et al., Augmented Reality with Automatic Camera Calibration for Driver Assistance Systems, May 2009, XI Symposium on Virtual and Augmented Reality—SVR 2009, pp. 29-36.*

Anton Fuhrmann et al., "Practical Calibration Procedures for Augmented Reality," Rendering Techniques '98, Jan. 1, 2000, XP055203486.

A. Tang et al., "Evaluation of calibration procedures for optical see-through head-mounted displays," Proceedings/The Second IEEE and ACM International Symposium on Mixed and Augmented Reality, Oct. 7, 2003, pp. 161-168, XP010662807.

Stuart J. Gilson et al., "Spatial calibration of an optical see-through head mounted display," Journal of Neurosci Methods, Aug. 15, 2008, vol. 173, No. 1, pp. 140-146.

Jim Braux-Zin et al., "Calibrating an optical see-through rig with two non-overlapping cameras : The virtual camera framework;" Oct. 2012.

Richard Hartley et al., "Multiple View Geometry in Computer Vision," Cambridge University Press, pp. 155-157.

J. Weng et al., "Camera calibration with distortion models and accuracy evaluation," IEEE Transactions on Pattern Analysis and Machine Intelligence, vol. 14, No. 10, 1992, pp. 965-980.

Aubrey K. Dunne et al., "A comparison of new generic camera calibration with the standard parametric approach," In: MVA2007—IAPR Conference on Machine Vision Applications, May 16-18, 2007, Tokyo, Japan.

R. K. Lenz et al., "Techniques for calibration of the scale factor and image center for high accuracy 3-D machine vision metrology," IEEE Trans on Pattern Analysis and Machine Intelligence, PAMI-10:713-720, 1988.

* cited by examiner

METHOD FOR CALIBRATING AN AUGMENTED REALITY VISUAL RENDERING SYSTEM COMPRISING AT LEAST ONE DISPLAY DEVICE THAT IS PARTIALLY TRANSPARENT WITH RESPECT TO THE USER THEREOF, AND ASSOCIATED SYSTEM

CROSS-REFERENCE TO RELATED APPLICATIONS

This application is a National Stage of International patent application PCT/EP2015/078139, filed on Dec. 1, 2015, which claims priority to foreign French patent application No. FR 1461866, filed on Dec. 3, 2014, the disclosures of which are incorporated by reference in their entirety.

FIELD OF THE INVENTION

The present invention pertains to a method for calibrating an augmented reality visual rendering system comprising at least one display device that is partially transparent with respect to the user thereof, and to an associated system.

BACKGROUND

Augmented reality visual rendering systems comprising at least one partially transparent display device, such as "Google glasses", are known, these being described in a patent application US 2013/0044042. Augmented reality visual rendering systems such as augmented reality windshields are also known.

Such systems often comprise partially transparent display devices often loosely referred to as semi-transparent display devices.

Partially transparent display systems, such as semi-transparent glasses, semi-transparent screens, systems for projection onto semi-transparent surfaces, etc., make it possible to augment the user's view by inserting (augmented reality) or deleting (diminished reality) visual elements in the user's field of vision. The benefit of these semi-transparent display devices resides notably in the fact that the user continues to perceive the real environment with no latency time and according to the same viewpoint as the latter would have without the display device.

Nonetheless, numerous applications require that the information displayed on the partially transparent device be aligned with real elements of the scene according to the user's viewpoint. For example, the display device can be used to highlight an element of the real scene. The activated display zone must then be projected onto the retina of the user's eye at the same place that the image of the real object is projected. It is then necessary to calibrate the "eye-display device" system so as to afford a model characterizing the projection of the image displayed on the display device on the retina of the eye.

Given that the position of the display device with respect to the eye can vary from one user to another (for example due to the difference in inter-pupillary distance between different users), or indeed from one use to another for one and the same user (slight variation in the position of the glasses on the head), calibration carried out in the factory does not make it possible to obtain optimal alignment of the image displayed on the glasses with the user's natural vision. It is therefore beneficial to enable the user to be able to calibrate or refine a previous calibration, so as to obtain a calibration suitable for the current conditions of use of the device. The main technical problem then consists in providing an ergonomic solution enabling the user to perform a calibration at their workplace or to refine the factory calibration.

There is known, from the document "Spatial calibration of an optical see-through head mounted display" by Stuart J. Gilson, Andrew W. Fitzgibbon and Andrew Glennerster, a scheme for calibrating semi-transparent glasses in which the head of the user is replaced by that of a mannequin comprising a camera in the guise of an eye. The image provided by the camera is used to calibrate the semi-transparent glasses. Accordingly, a calibration testcard is used. The testcard is placed in front of the mannequin head and then detected in the image captured by the camera. Though the use of a camera instead of the eye makes it possible to use computer-vision algorithms to detect a calibration testcard and calibrate the system, this approach nonetheless exhibits significant limitations. In particular, this scheme assumes that the user's eye is sited at the same place as the camera whilst the glasses can be worn by users, the morphology of whose head may vary. Moreover, the calibration process requires a mannequin head equipped with a camera. Though this constraint is compatible with in-factory calibration, it is not compatible with calibration carried out away from the factory.

It is also known to require user interactions in order to perform a calibration. Thus, the system successively displays points in a pair of glasses, and the user must align each of these 2D points (of a two-dimensional space of the display device) with a 3D point (in the user's space) whose coordinates are known in the reference frame of the user's head.

The document "Calibrating an optical see-through rig with two non-overlapping cameras: The virtual camera framework" by J. Braux-Zin, A. Bartoli, and R. Dupont proposes to calibrate a semi-transparent screen by using a calibration testcard exhibiting 3D points of known coordinates. The user is then invited to move a pointer on the screen in such a way as to designate the position on the screen where each 3D point of the testcard is perceived by the user. This procedure exhibits several drawbacks. Firstly, in order for the calibration to be accurate over the whole of the screen, the testcard used must cover the whole of the screen or be moved in tandem with the calibration process. Such a procedure is therefore conceivable within the framework of an in-factory calibration but is somewhat ill-adapted for a calibration procedure carried out at the spot where the device is utilized. Moreover, this requires that a device for pointing at the screen of mouse/touchpad type be available, this not always being the case, in particular in the case of semi-transparent glasses.

Document US 2002/0105484 (Navab and Tuceryan) proposes to use a 3D point whose position is fixed in the environment, and it is then up to the user to move their head so as to align the 2D point with the image of the 3D point perceived by the user's eye. It also proposes to use a mobile stylus whose tip is located in 3D that the user is invited to move in such a way as to align the tip of the latter with the 2D point displayed in the glasses. In both cases, when the user estimates that the 3D point is aligned with the 2D point displayed in the glasses, the latter indicates this to the system and the association between the 3D point and the 2D point is stored. When a sufficient number of such associations is available, the calibration is carried out with the aid of a conventional algorithm for camera calibration. Though this type of approach makes it possible to calibrate the device for the user's eye, the procedure used exhibits in particular the drawback of being rather unergonomic. Indeed, the scheme used being based on a successive capture of positions of 3D points, this requires the user to remain motionless when he considers that the 3D point is correctly aligned with the 2D point displayed in the glasses, doing so for the time it takes to validate the capture. This step, requiring a motionless position of the user, is carried out a large number of times (once for each association between a 3D point and 2D point), this generally involving significant muscular fatigue for the user, and rendering the calibration process lengthy to carry out. This lack of ergonomics may then lead to rejection of the device by the end user.

Stated otherwise, the main limitation of this solution is related to the fact that the user must move their hand and their head so as to align the tip of the stylus with the 2D point displayed, and then remain still for the time it takes to validate the alignment. During this time of motionlessness, the user moves neither their hand nor their head. Accurate calibration makes it necessary to repeat this step for tens of 2D points, thereby rapidly giving rise to muscular fatigue and making the calibration process lengthy.

SUMMARY OF THE INVENTION

An aim of the invention is to alleviate these problems.

There is proposed, according to one aspect of the invention, a method for calibrating an augmented reality visual rendering system comprising at least one display device that is partially transparent with respect to the user thereof, comprising carrying out at least once the steps consisting in:

displaying a two-dimensional calibration curve on a partially transparent display device of the partially transparent display device;

recording a three-dimensional curve described by the user by means of a three-dimensional pointing device so that the trajectory described by the three-dimensional pointing device is aligned, according to the viewpoint of the user, with the two-dimensional calibration curve displayed on the display device; and matching the three-dimensional curve and the two-dimensional calibration curve displayed on the display device and comprising a step consisting in calibrating said augmented reality visual rendering system by determining the parameters of a model making it possible to represent the set comprising the user's eye and the partially transparent display device of the partially transparent display device at which the eye is looking, on the basis of said matching.

Such a method enables calibration to be made much easier for the user. Indeed, since the user does not have to maintain a motionless posture, he avoids the problem of muscular fatigue. Moreover, the calibration can be carried out on the basis of a single pair (3D curve/2D curve) whilst the other schemes require several (2D point/3D point) pairs. Consequently, the present invention reduces the number of user interactions, and therefore makes it possible to carry out a calibration in a reduced time and in a more ergonomic manner.

In one embodiment, said step consisting in matching the three-dimensional curve and the two-dimensional calibration curve displayed on the display device comprises the sub-steps consisting in:

projecting the three-dimensional curve onto the display device so as to provide a two-dimensional projected curve and an association between points of the three-dimensional curve and points of the projected curve; and projecting said two-dimensional projected curve onto the corresponding calibration curve so as to provide an association between points of the two-dimensional projected curve and points of the corresponding calibration curve.

Thus, that point of the 2D curve with which the correspondence is the most probable is identified for each point of the 3D curve and not solely for a subset of points of the curve having identifiable geometric characteristics (for example the points corresponding solely to local extrema of curvature, such as the intersection of two segments).

In fact, this step makes it possible to solve the problem of the point-to-point association between arbitrary curves, this being a complex problem.

According to one embodiment, the method comprises, furthermore, in an iterative manner, the following steps consisting in:

re-estimating the matching of the three-dimensional curve or curves and the respective two-dimensional calibration curve or curves displayed on the display device, on the basis of the new parameters of the model which were determined during the last calibration step; and re-calibrating said augmented reality visual rendering system, on the basis of the last matching of the three-dimensional curve or curves and the respective two-dimensional calibration curve or curves displayed on the display device.

Thus, the calibration is improved without having to make the user redo manipulations.

For example, said iteration is stopped when a convergence criterion is attained.

In one embodiment, the calibration curve or curves comprise at least one curve exhibiting at least one discontinuity, and/or at least one polygonal curve.

Thus, it is possible to identify without ambiguity certain points of the 2D curves displayed on the display device and the corresponding points of the corresponding 3D curve.

According to one embodiment, the calibration curve or curves comprise at least one curve whose display on the display device guarantees that no point of the display device is situated at a distance from the curve exceeding 25% of the diagonal of the display device.

The use of such a curve makes it possible to obtain pairings distributed over the whole of the display device, and makes it possible to guarantee a valid calibration for all the zones of the display device.

For example, the calibration curve or curves comprise at least one Hilbert curve, and/or at least one Peano curve, and/or at least one Lebesque curve.

In one embodiment, said calibration is applied to an augmented reality glasses system.

As a variant, said calibration can be applied to an augmented reality windshield system.

There is also proposed, according to another aspect of the invention, an augmented reality visual rendering system, adapted to implement the method as described above.

For example, the augmented reality visual rendering system is an augmented reality glasses system or an augmented reality windshield system.

BRIEF DESCRIPTION OF THE DRAWINGS

The invention will be better understood on studying a few embodiments described by way of wholly non-limiting examples and illustrated by the appended drawings in which.

DETAILED DESCRIPTION

The example mainly described uses a single calibration curve, in a nonlimiting manner, since, as a variant, a plurality of calibration curves can be used successively.

Figure 1:
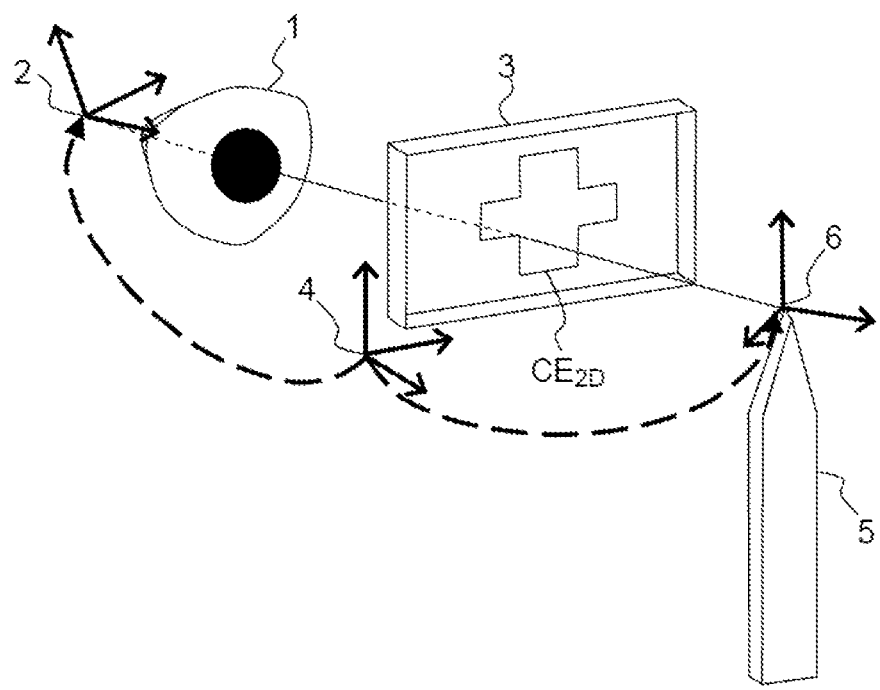
FIGS. 1 to 3 schematically illustrate a method according to one aspect of the invention.

FIG. 1 schematically illustrates a system and a method according to one aspect of the invention.

In FIG. 1 are represented the eye of the user 1, the reference frame of the user 2, a partially transparent display device 3, in this instance a partially transparent screen of augmented reality glasses, which is tied in terms of motion to the user's head, according to a temporally constant rigid transformation, and a reference frame 4 of the partially transparent screen 3. A two-dimensional calibration curve $CE_{2D}$ is displayed on the partially transparent screen 3. A pointing device 5, in this instance a stylus, is also represented together with its reference frame 6.

Figure 2:
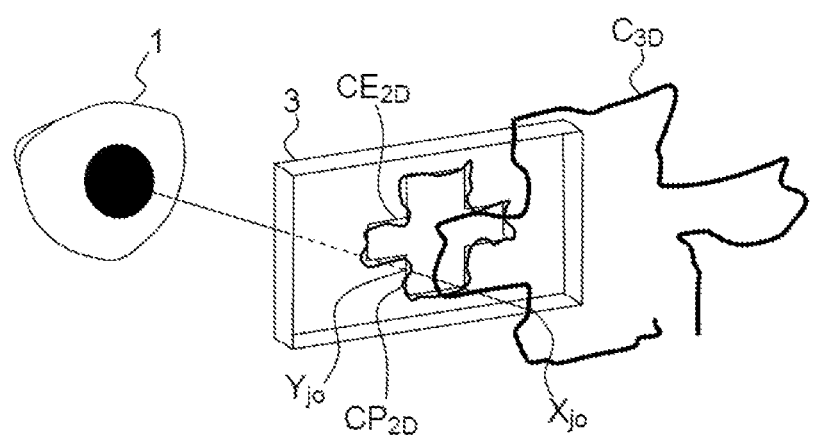

In FIG. 2 are represented the displays of the two-dimensional calibration curve $CE_{2D}$, as well as the three-dimensional curve $C_{3D}$ which is described by the user by means of the three-dimensional pointing device 5 so that the trajectory described by the three-dimensional pointing device 5 is aligned, according to the viewpoint of the user 1, with the two-dimensional calibration curve $CE_{2D}$ displayed on the semi-transparent screen 3.

A two-dimensional projected curve $CP_{2D}$ on the semi-transparent screen 3 may, for example, be used as intermediate curve to match the three-dimensional curve $C_{3D}$ and the two-dimensional calibration curve $CE_{2D}$ which is displayed on the semi-transparent screen 3.

It is considered that the pointing device 5 provides a 3D position expressed in the reference frame 4 rigidly tied to the partially transparent screen 3. For example, the stylus 5 and the glasses 3 are located by one and the same tracking device, such as a camera fixed on the glasses, a magnetic or acoustic tracking device, some of whose receivers are fixed on the glasses as well as on the stylus 5. Consequently, the position of the glasses and of the stylus are known according to a common reference frame 4 (that of the tracking device).

For the two-dimensional calibration curve $CE_{2D}$ displayed on the semi-transparent screen 3, the parametric or non-parametric representation is denoted $U_0$.

The user is invited to move the 3D pointing device 5 in such a way that the trajectory described by the tip 6 of the latter 5 and the 2D calibration curve displayed on the partially transparent screen 3 is aligned from the viewpoint of the eye of the user 1. The 3D trajectory is stored by the system and this trajectory is denoted $V_0$. The pointing device 5 can be a stylus whose tip 6 can be located with the aid of a magnetic, optical, mechanical or acoustic location device or a laser tracking device, etc. The pointing device can also be the finger of the user, the end of the latter being able to be located with the aid of an optical system such as a 3D camera, a stereovision head, etc.

If an approximate calibration of the device is available, for example done in the factory, then it can be used to perform the sub-step of projecting the 3D curve $C_{3D}$ onto the partially transparent screen 3 so as to provide a 2D projected curve $CP_{2D}$ and an association between points of the 3D curve and points of the 2D projected curve $CP_{2D}$, the 3D trajectory of the pointer 5. Each point of the 3D trajectory $C_{3D}$ can then be associated with a point of the calibration curve $CE_{2D}$ which is closest to the point corresponding to its projection on the projected curve $CP_{2D}$.

This can therefore, for example, proceed in the following manner:

The trajectory $V_0$, represented by the curve $C_{3D}$, is sampled at a set $\{Xj_0\}_{j=0...N}$ of 3D points. Each point $Xj_0$ is projected in 2D onto the partially transparent screen 3 according to the current calibration, thus providing a 2D point denoted $Yj_0$ as illustrated in FIG. 2.

Figure 3:
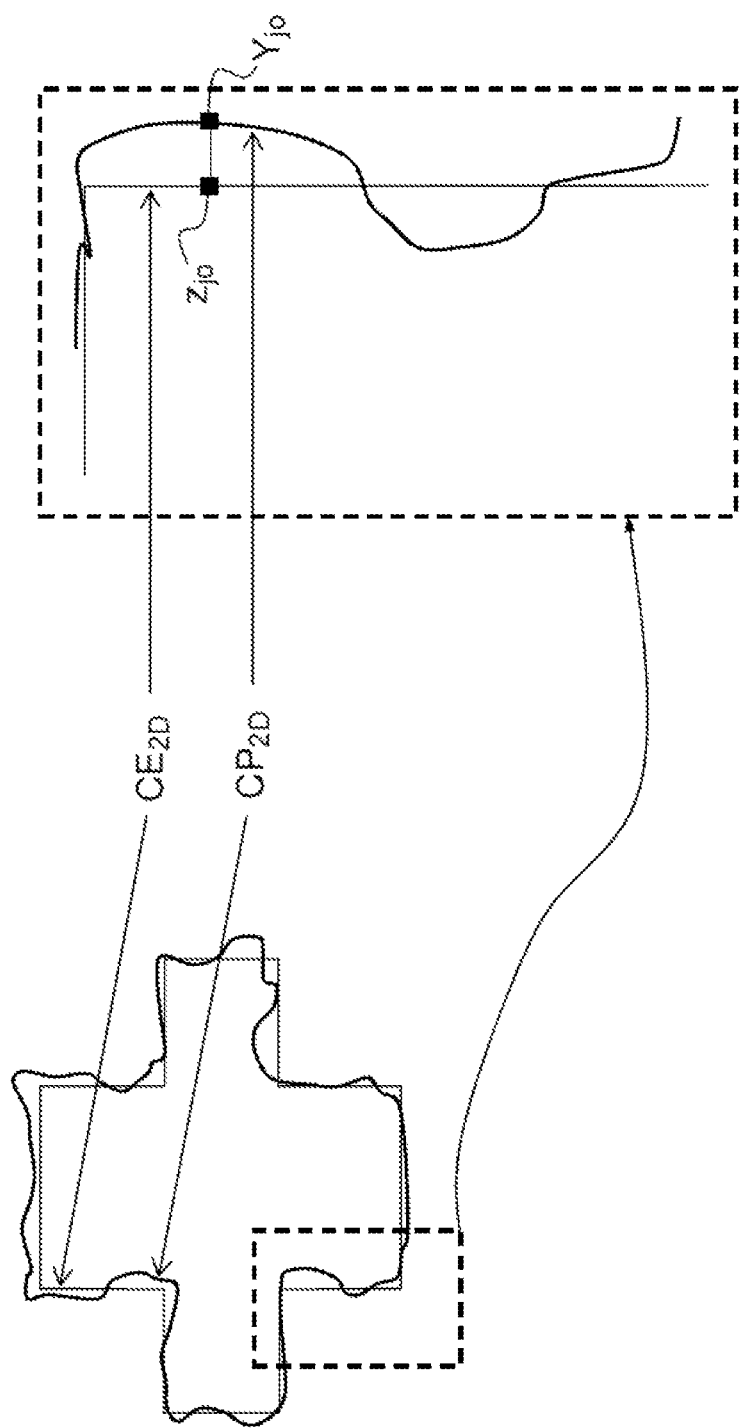

Each point $Yj_0$ is then associated with a respective point $Zj_0$ of the calibration curve $CE_{2D}$ displayed on the semi-transparent screen 3, having parametric or non-parametric representation $U_0$, which is closest to it (the distance used can be any norm, such as the Euclidean norm, the 1 norm, the infinite norm, etc.), as illustrated in FIG. 3.

If no approximate calibration of the device is available, the geometric properties of the 2D calibration curve $CE_{2D}$ can be used to establish this correspondence. Thus, if the calibration curve $CE_{2D}$ displayed is polygonal, the 3D trajectory $C_{3D}$ of the pointer 5 can be analyzed so as to identify the points of the trajectory which correspond to the vertices of a polygonal curve. Once the vertices of the displayed polygon $CE_{2D}$ have been associated with their assumed respective corresponding opposite numbers from the 3D trajectory $C_{3D}$, a transfer function can be estimated and then used to associate each point of the 3D trajectory $C_{3D}$ with a point of the 2D calibration trajectory $CE_{2D}$.

If an initial calibration is available, such as a calibration performed previously in the factory, then the new calibration can be estimated by using a nonlinear optimization algorithm (gradient descent, Levenberg-Marquardt, Dogleg, etc.) to modify these initial values so that the respective projections $\{Yj_0\}$ of the points $\{Xj_0\}$ according to the new calibration are situated as close as possible to the respective points $\{Zj_0\}$ of the displayed 2D calibration curve $CE_{2D}$ which have been associated with them.

If no initial calibration is available, the calibration can be carried out with the aid of a linear estimation algorithm. In the case of the use of a pinhole model to represent the system, it is possible to use algorithms such as are cited in the documents "Multiple View Geometry in Computer Vision", by Richard Hartley and Andrew Zisserman (2003), Cambridge University Press. pp. 155-157, ISBN 0-521-54051-8; "Techniques for calibration of the scale factor and image center for high accuracy 3-D machine vision metrology", by K. Lenz and R. Tsai, IEEE Trans on Pattern Analysis and Machine Intelligence, PAMI-10:713-720, 1988; "Camera calibration with distortion models and accuracy evaluation", by J. Weng, P. Cohen, and M. Herniou, IEEE Trans on Pattern Analysis and Machine Intelligence, PAMI 14(10):965-980, 1992; or "A comparison of new generic camera calibration with the standard parametric approach" by Dunne Aubrey K., Mallon John and Whelan Paul F. (2007), In: MVA2007-IAPR Conference on Machine Vision Applications, 16-18 May 2007, Tokyo, Japan 01/2007, etc. A step of nonlinear optimization of this calibration can be added so as to increase the accuracy of the calibration.

It is possible to implement an iterative method. The step of matching the 3D curve and the 2D calibration curve displayed on the semi-transparent screen and the calibration step can be repeated so as to increase the quality of the calibration. Thus, the result of the calibration step is used as approximate calibration for matching of the following iteration. The calibration being more accurate than that used in the previous step of matching between the trajectory $C_{3D}$ and the calibration curve $CE_{2D}$ displayed, of the previous iteration, the new matching of the trajectory $C_{3D}$ and of the calibration curve $CE_{2D}$ displayed will be carried out with greater accuracy. This iterative improvement of the matching then makes it possible to improve the accuracy of the calibration of the following iteration. The iterative process therefore makes it possible to improve both the matching between the trajectory $C_{3D}$ and the calibration curve $CE_{2D}$ displayed, and the calibration. Stated otherwise, the curve or curves is or are re-interpreted with the new optical center or the parameters of the model characterizing the projection of the image displayed on the display device on the retina of the eye.

It is also possible to use a plurality of calibration curves. The steps of displaying a calibration curve and of recording a three-dimensional curve described by the user by means of a three-dimensional pointing device can be repeated several times with different curves before a calibration step. A curve displayed on the screen can vary in shape each time, before executing the step of matching between a 3D curve and the corresponding calibration curve. Thus, a set of 2D calibration curves $CE_{2D}$ (denoted $\{Ui\}_{i=0\ldots M-1}$ with M the number of curves displayed) displayed on the semi-transparent screen 3, and a set of associated 3D trajectories $C_{3D}$ (denoted $\{Vi\}_{i=0\ldots M-1}$), are made available.

The step of association or matching between a 3D trajectory $C_{3D}$ and the corresponding calibration curve $CE_{2D}$ displayed is then repeated for each trajectory/calibration curve pair displayed. The calibration step is then modified so as to consider a set of calibration curves rather than just one. Thus, each trajectory Vi is sampled at a set of points denoted $\{Xj_i\}_{j=0\ldots N}$. For each point $Xj_i$, the projection of this point according to the current calibration is denoted $Yj_i$. Each point $Yj_i$ is then associated with the 2D point closest to the 2D calibration curve corresponding to it, this point being denoted $Zj_i$. The calibration step is then estimated so as to minimize the distance between the projections of the points $\{Xj_i\}_{j=0\ldots N;\, i=0\ldots M-1}$ and the corresponding points on the calibration curve displayed $\{Zj_i\}_{j=0\ldots N;\, i=0\ldots M-1}$.

The steps of the above-described method can be performed by one or more programmable processors executing a computerized program so as to execute the functions of the invention by operating on input data and generating output data.

A computer program can be written in any form of programming language, including compiled or interpreted languages, and the computer program can be deployed in any form, including in the guise of an autonomous program or as a subprogram, element or other unit appropriate for use in a computing environment. A computer program can be deployed so as to be executed on a computer or on several computers at a single site or distributed over several sites and linked together by a communication network.

The preferred embodiment of the present invention has been described. Diverse modifications may be made without deviating from the spirit and the scope of the invention. Consequently, other implementations are within the scope of the following claims.

The invention claimed is:

1. A method for calibrating an augmented reality visual rendering system comprising at least one display device that is partially transparent with respect to the user thereof, comprising carrying out at least once the steps of:
    displaying a two-dimensional calibration curve on a partially transparent display device;
    recording a three-dimensional curve described by the user by means of a three-dimensional pointing device so that the trajectory described by the three-dimensional pointing device is aligned, according to the viewpoint of the user, with the two-dimensional calibration curve displayed on the display device; and
    matching the three-dimensional curve and the two-dimensional calibration curve displayed on the display device;
    and comprising a step of calibrating said augmented reality visual rendering system by determining the parameters of a model making it possible to represent the set comprising the eye of the user and the partially transparent display device of the partially transparent display device at which the eye is looking, on the basis of said matching,
    wherein the calibration curve or curves comprise at least one curve whose display on the display device guarantees that no point of the display device is situated at a distance from the curve exceeding 25% of the diagonal of the display device.

2. The method as claimed in claim 1, wherein the step of matching the three-dimensional curve and the two-dimensional calibration curve displayed on the display device comprises the sub-steps of:
    projecting the three-dimensional curve onto the display device so as to provide a two-dimensional projected curve and an association between points of the three-dimensional curve and points of the projected curve; and
    projecting said two-dimensional projected curve onto the corresponding calibration curve so as to provide an association between points of the two-dimensional projected curve and points of the corresponding calibration curve.

3. The method as claimed in claim 1, comprising, furthermore, in an iterative manner, the following steps of:
    re-estimating the matching of the three-dimensional curve or curves and the respective two-dimensional calibration curve or curves displayed on the display device, on the basis of the new parameters of the model which were determined during the last calibration step; and
    re-calibrating said augmented reality visual rendering system, on the basis of the last matching of the three-dimensional curve or curves and the respective two-dimensional calibration curve or curves displayed on the display device.

4. The method as claimed in claim 3, wherein said iteration is stopped when a convergence criterion is attained.

5. The method as claimed in claim 1, wherein the calibration curve or curves comprise at least one curve exhibiting at least one discontinuity, and/or at least one polygonal curve.

6. The method as claimed in claim 1, wherein the calibration curve or curves comprise at least one Hilbert curve, and/or at least one Peano curve, and/or at least one Lebesque curve.

7. The method as claimed in claim 1, wherein said calibration is applied to an augmented reality glasses system.

8. The method as claimed in claim 1, wherein said calibration is applied to an augmented reality windshield system.

9. An augmented reality visual rendering system, adapted to implement the method as claimed in claim 1.

10. The augmented reality visual rendering system as claimed in claim 9, being an augmented reality glasses system or an augmented reality windshield system.

11. The method as claimed in claim 1, wherein the three-dimensional pointing device is a stylus.

* * * * *